United States Patent [19]

Javan

[11] 4,274,063
[45] Jun. 16, 1981

[54] INFRARED SPECTROSCOPIC LAMPS AND GAS DETECTORS INCORPORATING SUCH LAMPS

[76] Inventor: Ali Javan, 12 Hawthorn St., Cambridge, Mass. 02138

[21] Appl. No.: 899,573

[22] Filed: Apr. 24, 1978

Related U.S. Application Data

[63] Continuation-in-part of Ser. No. 755,463, Dec. 30, 1976, abandoned.

[51] Int. Cl.$^3$ .............................................. H01S 3/22
[52] U.S. Cl. .............................................. 331/94.5 R
[58] Field of Search ................. 331/94.5 D, 94.5 G; 330/4.3

[56] References Cited

U.S. PATENT DOCUMENTS

3,761,838  9/1973  Bhaumik et al. ............... 331/94.5 G

*Primary Examiner*—William L. Sikes

[57] ABSTRACT

A novel enhanced infrared spectral light source employing gas discharge, to be designated hereafter as EISLS, and a detection system using such an EISLS lamp for gas detection of a given molecular gas, the lamp adapted to produce spectral radiation at selected, sharply defined, spontaneous emission frequencies in the infrared corresponding to an absorbing molecular rotation-vibration transition band of the given gas. According to one feature, a gas mixture within the chamber provides an excitable buffer gas and a quantity of the given gas, the buffer gas having a state excitable by the excitation means and matched to the given gas in the manner that energy from the buffer gas state can transfer via collisions to the given gas and excite the upper levels of the absorbing transition band, whereby resultant radiative decay of the upper levels to the lower levels of the absorbing transition band produces the desired selected spontaneous emissions from the given gas, enhanced by the buffer gas. The given gas may be placed in the chamber or may be produced by interactions of other gases and the electrical discharge within the chamber.

According to another feature, in such an EISLS spectroscopic lamp which produces spontaneous emissions corresponding to an absorbing band and other undesired spontaneous emissions as a result of excitation of other levels, the parameters being selected to make the desired emissions have a decay time long relative to the decay time of the undesired emissions, means are provided to interrupt the excitation means periodically and to delay the utilization of emission from the lamp a time following the instant of each interruption to the period when the other levels and associated emissions are decayed and the given gas continues to emit at the desired transition.

According to another feature an EISLS spectroscopic lamp which produces sharply defined spontaneous emissions corresponding to an absorbing band of a given gas is arranged to direct its emission along a detection path in which the given gas may appear, and is combined with means to provide a modulated magnetic field either in the detection path to cause modulation of the absorbing transitions of paramagnetic gas to be detected or in paramagnetic emitting gas in the lamp to cause frequency modulation of the emitted spectral radiation, and an electronic detection means is provided, responsive to the resultant modulated intensity reaching the detector, to enhance the detection sensitivity.

15 Claims, 16 Drawing Figures

FIG 2a   DISCHARGE EXCITATION
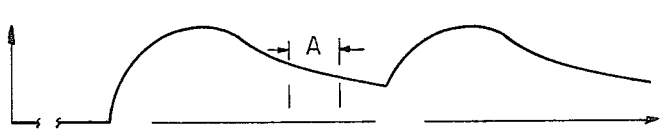
FIG 2b   INTENSITY OF $V=1 \to 0$ IN CO
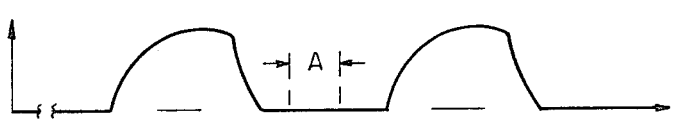
FIG 2c   INTENSITY OF A SPURIOUS EMISSION
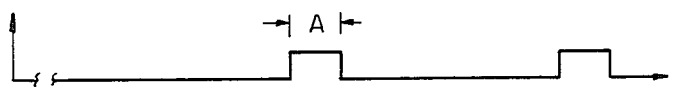
FIG 2d   GATE
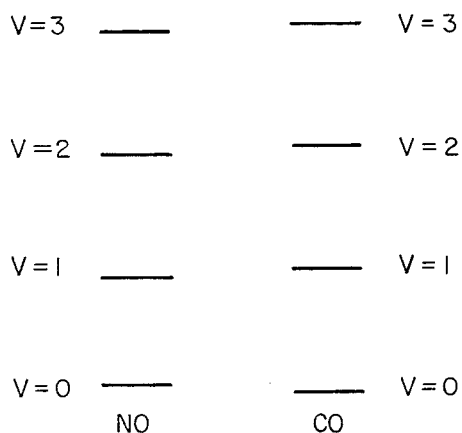
FIG 3a
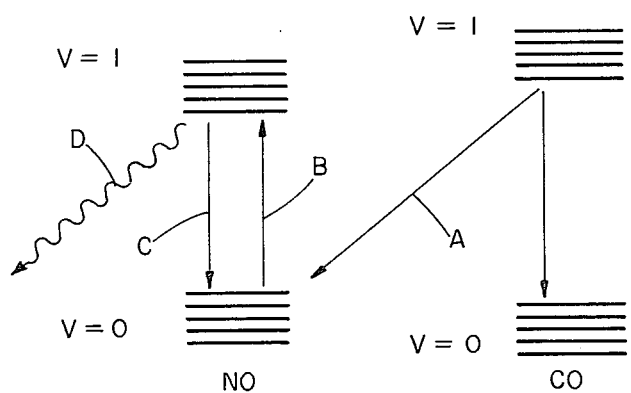
FIG 3b
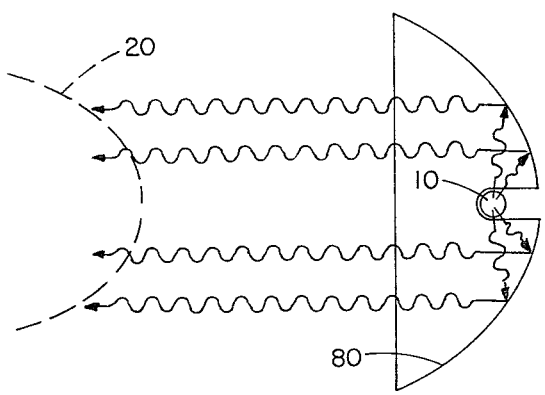
FIG 4a
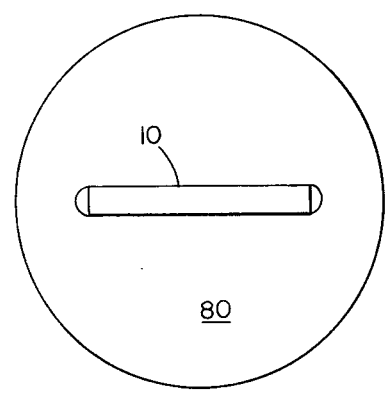
FIG 4

INFRARED SPECTROSCOPIC LAMPS AND GAS DETECTORS INCORPORATING SUCH LAMPS

This application is a continuation-in-part of Ser. No. 755,463, filed Dec. 30, 1976, now abandoned.

There ae molecular trace-gas detector and other infrared spectroscopic applications in which the Fabre Perot or other structure of a laser will be too expensive for jobs requiring intense emissions at absorbing frequencies and a simpler light source will be more desirable. The present invention provides simple and versatile non laser gas discharge lamps and gas detector systems incorporating such lamps in which intense spectral spontaneous emissions in the infrared are obtained at given molecular bands which are normally heavily absorbing. Such emissions are useful in sensing by absorption techniques the presence of a gas in a volume into which the emission is directed.

In a conventional gas-discharge light source spontaneous emissions at absorbing transitions are generally weak due to reabsorption of these emission lines by the absorbing gas present in the gas discharge or in the adjacent volume inside the lamp. The reabsorption can be prevented by operating at reduced partial pressures of the absorbing gas. At reduced partial pressures, however, the emission lines, in general, will become weak due to a reduction in density of the molecules in their excited states. According to the invention such emissions are selectively enhanced for utilization in gas detectors and steps are taken to limit the effects of unwanted, close-lying emissions and to enhance detection sensitivity.

Before proceeding, it is to be noted that the development of gas lasers has evolved from ideas in which selected atomic or molecular energy levels are preferentially excited in a gaseous discharge in the presence of laser structure such as a Fabre-Perot resonator, resulting in population inversion and enhanced emissions at transitions originating from these levels. In the first gas laser, the He-Ne, this is obtained in selected numbers of transitions in neon via a collision process in which the He atoms in their long-lived $^3S$ and $^1S$ states collide with the Ne atoms in their ground electronic state. Subsequent gas lasers have utilized similar processes. In the $N_2$—$CO_2$ laser, for example, the $v=1$ vibrational state of $N_2$, which is collisionally long-lived, excites the appropriate levels in $CO_2$. The present invention features means in a non laser infrared gas discharge lamp to produce similar collisional excitation processes selected to obtain large enhancements in the rate of excitation of upper energy levels of absorbing transitions in preferably the same kind of molecules as are to be detected such as CO, NO, $SO_2$ and a host of other gases. The invention also features a timing system which enables operation under the condition that spontaneous emission lines (originating from a buffer gas or from non-absorbing transitions of the same gas), other than a desired emission from an absorbing transition, are suppressed. Also, the invention features magnetic field modulation of paramagnetic gas in the detection path or in the non-laser lamp to modulate the intensity reaching the detector in a manner to enhance detection sensitivity.

More particularly, according to one aspect of the invention, an enhanced emission spectroscopic lamp for detection of a given molecular gas is provided which produces sharply defined spectral radiation at selected spontaneous emission frequencies in the infrared corresponding to an absorbing molecular rotation-vibration transition band of the given gas, the lamp comprising excitation means for creating a gaseous discharge within a chamber, a gas mixture within the chamber providing an excitable buffer gas and a quantity of the given gas, and means for transmitting emissions from the given gas to a point of utilization, the buffer gas selected to have a state excitable by the excitation means and matched to the given gas in the manner that energy from this buffer gas state can transfer via collisions to the given gas and excite the upper levels of the absorbing transition band of the given gas either directly or by a progressive decay process from higher levels of the given gas, whereby resultant radiative decay of the upper levels of the absorbing band to the lower levels produces the desired selected spontaneous emissions from the given gas enhanced by the buffer gas.

In one preferred embodiment given gas which shows no gain at the selected transition is maintained at a sufficiently low level of concentration to prevent detrimental reabsorption. Also in a preferred embodiment the buffer gas is a molecule having its first excited vibration state matched to an excited vibration state of the given gas, the state of the buffer gas being of a type which in its pure form decays essentially by a V–T collisional process, the excitation of the vibration state of the given gas by the buffer gas occurs by a near V—V collisional process and the state of the given gas excited directly by the buffer gas decays predominantly by a V–T collisional process while producing the desired emission. In another preferred embodiment an upper excited vibration state of the given gas is excited essentially by near V—V collisions with similarly excited molecules of the buffer gas, the upper excited vibration state of the given gas decays to a lower excited vibration state corresponding to the upper vibration state of the absorbing transition band and this lower excited vibration state decays predominantly by a V–T collisional process while producing the desired spontaneous emission.

In certain preferred embodiments the mixture of gases in the chamber includes components chemically reactive under the influence of the discharge of the excitation means to produce the given gas, preferably a control being provided to vary the quantity of at least one of the components to vary the quantity of the given gas present, in one instance the gas mixture comprising $N_2$ and CO, the given gas producible by the excitation means being NO and the control being adapted to vary the quantity of $N_2$ to accordingly vary the concentration of NO in the discharge. In other embodiments: the mixture comprises CO as the buffer gas and NO as the given gas (preferably in some cases the buffer gas also including $N_2$, excitation transfer from excited $N_2$ to CO serving to enhance the excited CO level and thereby enhance the desired NO level to produce the desired emission); the mixture provides $N_2$ as buffer gas and $SO_2$ as the given gas, the state of the buffer gas matched to the $2v_1$ vibrational mode in $SO_2$, the $2v_1$ decaying by near V—V collisions to the $v_1$ vibration mode thence to the $v_2$ vibration mode, emission from the $v_2$ band providing the desired emissions; the mixture provides $N_2$ as buffer gas and CO as the given gas; or the given gas is a hydrocarbon.

According to another feature of the invention, in an enhanced spectroscopic lamp herein described which produces spontaneous emissions corresponding to an absorbing band and other undesired spontaneous emissions as a result of excitation of other levels, the parameters being selected to make the desired emissions have a decay time long relative to the period of the undesired emissions, means are provided to interrupt the excitation means periodically and to delay the utilization of emission from the lamp a time following the instant of each interruption to the period when the other levels and associated emissions are decayed and the given gas continues to emit at the desired transition.

In preferred embodiments the excited vibration state of the gas which produces the desired emission is selected to decay predominantly by a V-T collisional process while the other levels of the gas mixture producing the undesired spontaneous emissions decay at a faster rate essentially by near V—V collisional processes, the time of the utilization being selected to commence after substantial decay of these other levels.

According to another feature of the invention, an enhanced spectroscopic lamp which produces sharply defined spontaneous emissions corresponding to an absorbing band of a given gas is arranged to direct its emission along a detection path and is provided with means to provide a modulated magnetic field either in the detection path to cause modulation of the absorbing transitions of paramagnetic gas to be detected or in paramagnetic gas in the lamp itself to cause frequency modulation of the emitted spectral radiation, and an electronic detection means is provided, responsive to the resultant modulated intensity reaching the detector to enhance the detection sensitivity.

These and other features and advantages of the invention will be understood from a more detailed description of certain preferred embodiments taken in conjunction with the drawings wherein.

Figure 1:
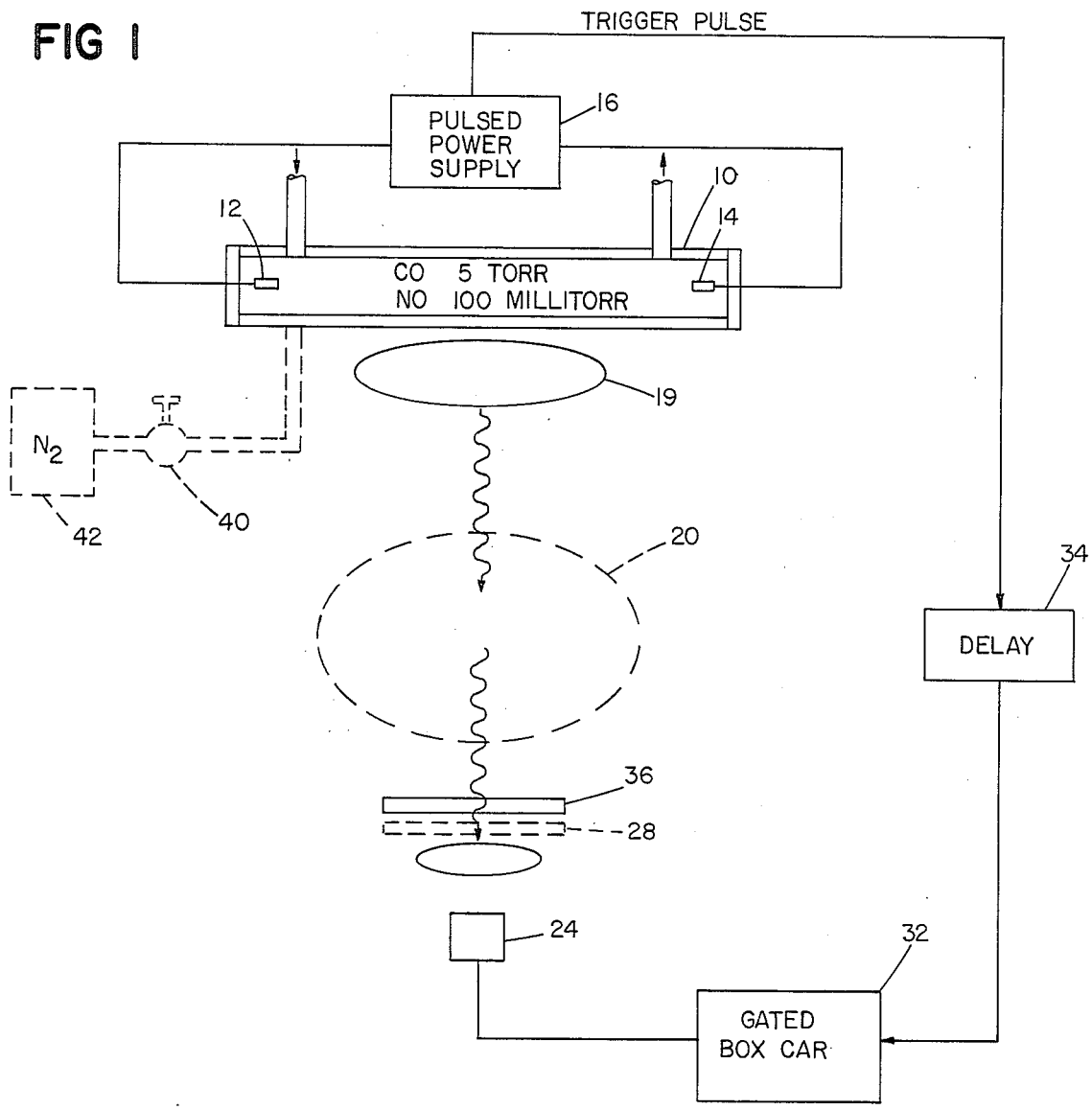
FIG. 1 is a diagrammatic representation of a preferred embodiment of a detection system according to the invention.
Figure 1A:
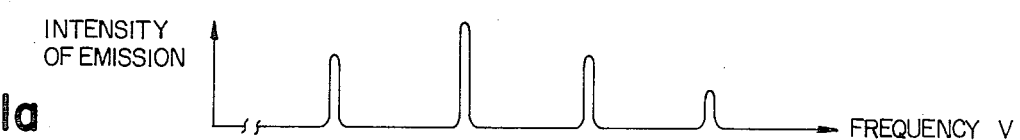
FIGS. 1a and 1b are diagrammatic plots against frequency respectively of intensity of emission from a given gas in the lamp and absorption of the given gas in the detection path of FIG. 1.
Figure 1B:
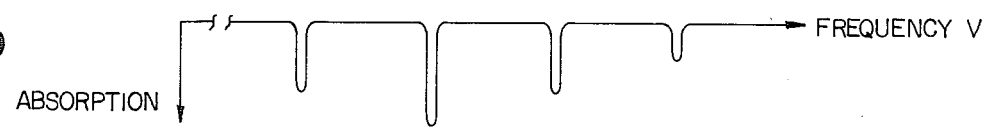
Figure 5:
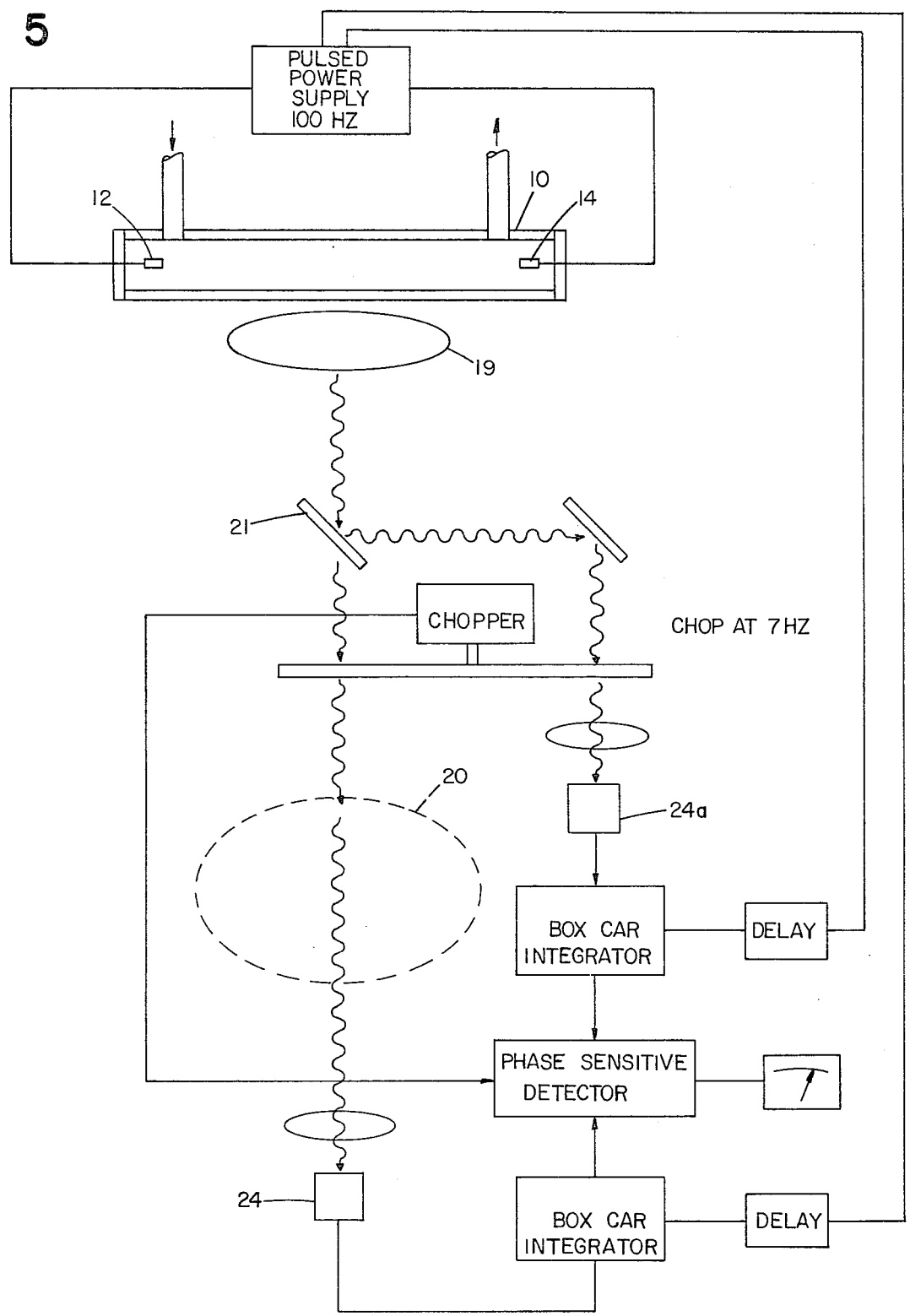
Figure 6:
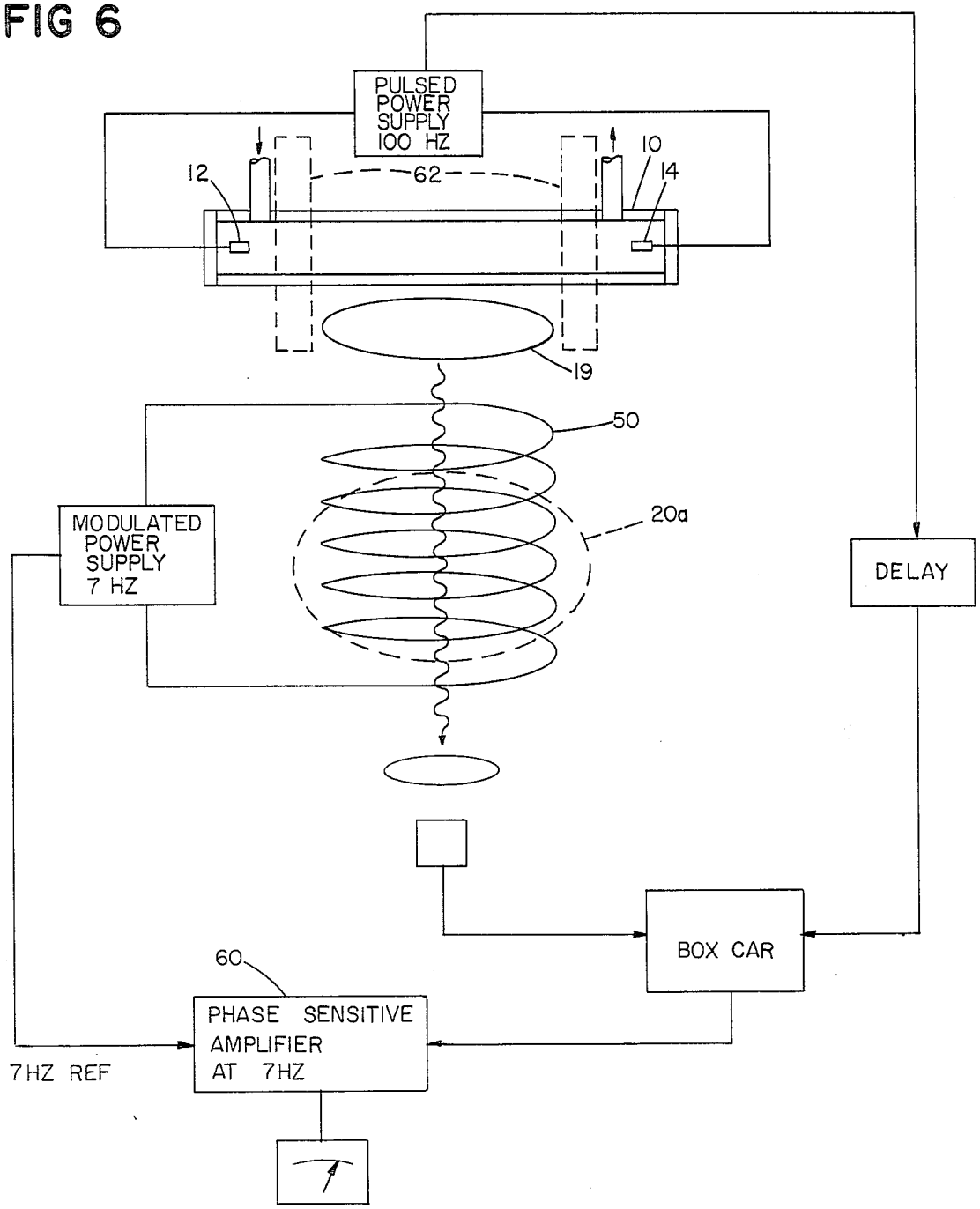
Figure 7A:
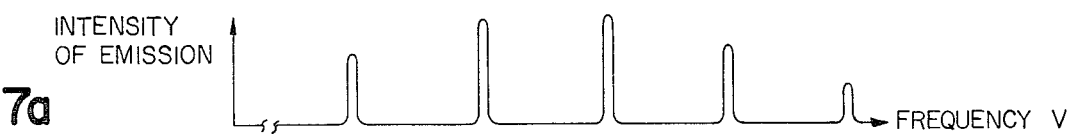
Figure 7B:
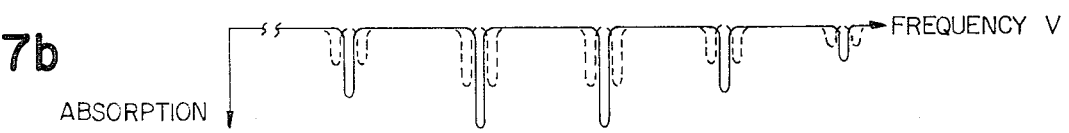
Figure 8:
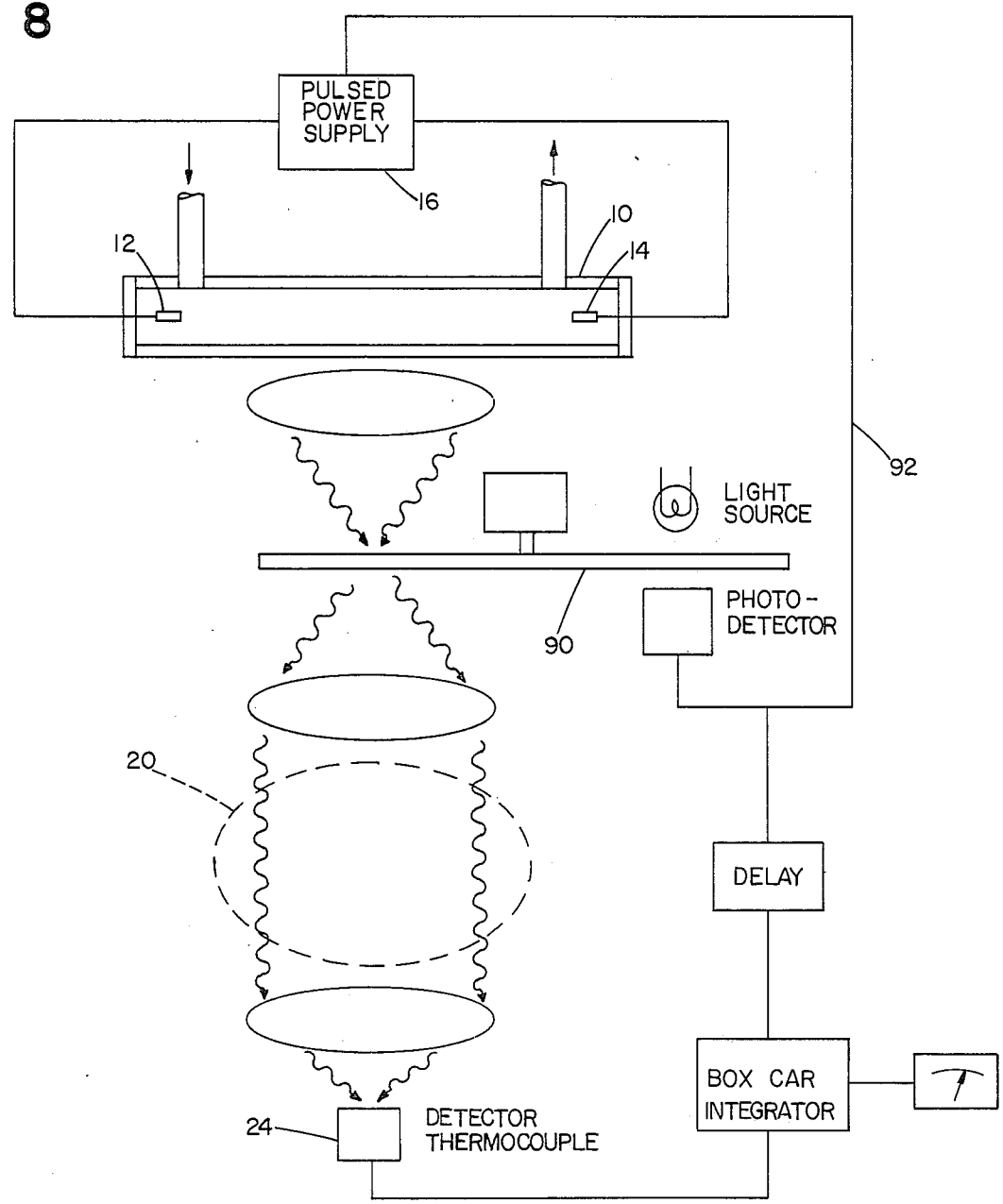

FIGS. 2a, b, c and d are diagrammatic plots against time respectively of the discharge excitation, the desired emission, a spurious emission and gated detection of the system of FIG. 1;

FIG. 3a is a representation of various levels of excitation of the given gas and buffer gas employed in the lamp of FIG. 1 while FIG. 3b is a representation of a process of excitation of an NO molecule by a CO molecule, and subsequent decay and emission of the NO molecule;

FIG. 4 is a view head-on and FIG. 4a a side crosssectional view of the assembly of the lamp of FIG. 1 with a parabolic reflector for producing a beam of the desired radiation;

FIG. 5 is a view similar to that of FIG. 1 of another preferred embodiment having a balanced detection system;

FIG. 6 is a view similar to that of FIG. 1 of another preferred embodiment employing magnetic modulation of paramagnetic trace or source gas for improving the sensitivity of detection;

FIGS. 7a and 7b are plots similar respectively to those of FIGS. 1a and 1b, illustrating the effects of the modulation of FIG. 6; and FIG. 8 is a view similar to FIG. 1 of another preferred embodiment.

To describe the invention, referring to FIG. 1, consider an infrared transparent gaseous discharge lamp chamber 10 having cathode 12, anode 14 an energization means 16 such as a pulsed voltage source, and a lens 19 through which emissions pass to a gas detection path 20, thence to a detector 24. The chamber 10 contains molecules of NO and the presence of NO is to be detected in the detection path, external to the chamber. The object in this case is to obtain strong spectral spontaneous emissions from the lamp at the absorbing $v=1\rightarrow0$ NO band and to direct these emissions through path 20. Note that all of the emitted rotation-vibration lines in this band, shown diagrammatically in FIG. 1a can be simultaneously used to probe for the presence of NO trace-gas in path 20 due to the corresponding absorptions in the trace gas, shown diagrammatically in FIG. 1b.

For the enhancement process, consider a buffer of CO gas at several (e.g. 5) torr pressure in the presence of NO at a lower partial pressure (e.g. 50 to 500 millitorr, depending on chamber size and discharge excitation current). In an excited discharge containing CO gas, vibrational states in the CO molecules will be heavily excited. In this system, the first excited CO vibrational state, $v=1$, will be particularly heavily populated, since its collisional relaxation lifetime is considerably longer than the higher vibrational states, $v>1$. In pure CO at one torr pressure, the $v=1$ state has a lifetime of about 1 second, while the higher vibrational level lifetimes are shorter than $10^{-6}$ seconds. This follows from a general property of molecules where the decay of the lowest excited vibrational state occurs via a V-T type collision process, while the states with $v>1$ mainly decay via a near V—V process. (For a complete understanding of these processes refer to L. Hocker, M. Kovacs, C. Rhodes, G. Flynn, A. Javan, Phys. Rev. Letts., Vol. 17, p. 233 et seq, August 1966; and R. M. Osgood, Jr., P. B. Sackett, A. Javan, J. of Chem. Phys., Vol. 60, p. 1464 et seq, February 1974).

To explain briefly here, in a V-T collision process, the internal vibrational energy is transferred to the translational energies of the colliding partners. In a V—V process, on the other hand, the internal vibrational energy is redistributed between the colliding partners and most of it still remains after the collision in the form of internal vibrational excitation.

We now note, referring to FIGS. 3a and 3b, that in NO, $v=1$ state lies at 1904 cm$^{-1}$, slightly below the $v=1$ state of CO (which lies at 2174 cm$^{-1}$). Because of this, a collision represented by arrow A in FIG. 3b between the $v=1$ state of CO and the ground-state of NO results in the excitation of NO molecules represented by arrow B via a rapid near-resonant V—V type process. This would result in a substantial selective excitation of the $v=1$ state of the NO molecules. Subsequently, this process will enhance the $v=1\rightarrow0$ emission band of NO, represented by arrow C and emission wave D.

At several tens of milli-torr NO partial-pressure, reabsorption in the lamp will not occur. In this connection it will be noted by detailed inspection that the collision process can, in fact, result in an inversion of population between the NO $v=1$ and its $v=0$ ground state. This can occur more readily if the gas temperature is reduced. (The reason lies in the fact that the NO $v=1$ state energy is slightly below the CO $v=1$ state.) The medium will show gain at the $v=1\rightarrow0$ transition, hence under such conditions there will be no absorption problem even at NO partial-pressures above several millitorr.

The possible presence of gain at $v=1\rightarrow 0$ band is, of course an interesting feature. However, the principle described can be used to obtain enhanced spontaneous emission at the $v=1\rightarrow 0$ band without requiring the presence of gain.

The spontaneous emission at the $v=1\rightarrow 0$ band in NO (which lies in the 5.2 micron region) will be accompanied by emissions at the $v\rightarrow v-1$ bands in CO for $v\geq 1$ as well as similar transitions in NO molecules. These other transitions also lie in the 5 micron region. Because of the shifts in energies of these various emission bands, it is possible to use a narrow band pass filter 28, such as a dielectrically-coated element, and discriminate against most of these emission bands. However, according to the invention preferably a drastically different approach is taken, taking advantage of the fact that the various emission bands appear time-resolved. This follows from the nature of the vibrational bands and their decay lifetimes described above. In this scheme, referring again to FIG. 1, the discharge 32 between the anode and cathode is switched on and off periodically (say, at one hundred Hz) by the pulsed exciting power supply 16. Immediately in the afterglow, the hot electrons in the discharge cool off in times on the order of a few microseconds or less. When this occurs, excitation of molecular energy levels by electron impact will cease. Along with this, the populations in the $v>1$ vibrational states in CO as well as in NO will rapidly decay due to the presence of the fast near V—V collision process described above. Accordingly, at times longer than tens of microseconds in the afterglow, there will be no emissions from levels with $v>1$. The long-lived $v=1$ states in CO and NO will be the only remaining excited states in the afterglow, with the $v=1$ state of CO continuing its excitation of the $V=1$ in NO. Hence, with an electronic detection gate 32 (e.g., a gated box car integrator) properly delayed by delay 34 to receive signal only in the afterglow, it is possible to entirely discriminate against the emissions from $v>1$ energy states. The emission at the $v=1\rightarrow 0$ of CO, which will continue in the afterglow can readily be filtered by an external absorbing CO gas filter The curves of FIGS. 2a, b, c and d illustrate the elimination of the effects of a close-lying spurious emission by the foregoing apparatus. As shown in FIGS. 2b and 2c high levels of both desired and spurious emissions occur during the excitation pulse from the power supply, FIG. 2a. Upon termination of the pulse the desired emission of FIG. 2b has a longer life in the afterglow than does the spurious emission of FIG. 2c, (preferably the former resulting from a V-T collisional process while the latter results from a near V-V process). The gated boxcar integrator is gated on only during stage A of the afterglow, with delay from termination of the exciting pulse, after the spurious emission has decayed and while the desired emission retains considerable intensity. Thus the emissions are time resolved in a simple manner and the integrated signal will represent only the desired emission and the absorbing effects of the gas in the detection path 20.

It will be understood that the just-described afterglow detection scheme can cooperate advantageously with the enhancement feature previously mentioned, as by eliminating the effects of spurious emissions from the enhancing buffer gas. Still the scheme, in a broader aspect has value apart from the enhancement scheme, as where, in some cases, the emitting gas is a pure onecomponent gas which still has spurious emissions.

Referring to FIG. 8 in a variation of the afterglow sensing scheme a mechanical chopper 90 in the emission path produces a trigger signal 92 which pulses the power supply 16, the chopper timed so that suitably focused emissions during the excitation pulse on the lamp strike the chopper and do not reach the detector 24. Only when the desired stage of the afterglow is reached does the chopper allow the emission to pass through the path 20 to reach detector. By such shielding of the detector, slow response and inexpensive detectors useful at room temperature, may be used, such as thermocouples, while eliminating the effects of spurious emissions by detecting in the afterglow after the spurious emissions have decayed.

There can be several variations of the above enhancement scheme as well. For instance, by adding $N_2$ to the (CO, NO) mixture, excitation transfer from excited $N_2$ vibration to CO can result in further enhancements of excited CO populations, hence resulting in increased excitation of the NO levels as described. Also, referring again to FIG. 1, according to the invention one may start with a gas mixture in the lamp chamber 16 consisting only of $N_2$ and CO gases. In this case, chemical reactions occurring in the discharge produce the necessary NO partial-pressure. By controlling the amount of $N_2$ introduced in the discharge using valve 40 and $N_2$ source 42, suggested by the dotted lines, it is possible to control the NO partial-pressure and adjust it for optimum performance.

There are other gas combinations which can result in similar types of enhancements. $H_2$ and NO (or HD and NO) can result in enhanced emission at the NO transition. In these cases, however, the excitation occurs primarily due to an energy match between the $v=1$ state of $H_2$ (or HD) and the $v=2$ state in NO, leading to the excitation of NO $v=2$ state. Subsequent V-V type collisions in NO produce the desired $v=1$ No states.

Another interesting example is the excitation of the $2v_1$ vibration in $SO_2$ by $N_2$ in its $v=1$ long-lived state. The $2v_1$ mode in $SO_2$ can decay to produce heavy excitation of the $v_1$ vibrational state. Inspection shows that, in this case, $v_1$ mode can again decay collisionally to produce heavy excitation of the $v_2$ mode; the $v_2$ emission band lies at 19 microns. This band is heavily absorbing. Other examples would include enhanced emission at the $v=1\rightarrow 0$ in CO obtained in a mixture of $N_2$ and CO (as in a CO laser gas mixture). Selective enhancement of emissions can also be obtained at absorbing transitions in methane, ethane, etc.

Referring now to FIGS. 4 and 4a, for efficient gathering of the emission from the tubular lamp chamber 16 of FIG. 1, the lamp is placed at the focal point of a parabolic reflector 80, which gathers the rays and transmits them through the detection path 20 as a parallel beam. Alternatively the lamp may be offset from the focal point to produce a beam which converges on the detector.

The embodiment of FIG. 5 is similar to that of FIG. 1 being more detailed in showing the use of a sapphire tube as the discharge chamber and sapphire lenses at the output of the tube for collecting radiation from the tube and for focussing radiation for detection. This embodiment also employs a balanced system using a beam splitter 21 to provide a reference signal and a chopper to modulate the two beams, with phase sensitive detection, thus to eliminate background effects.

Referring to the embodiment of FIG. 6 in this case the gas to be detected in path 20a is paramagnetic, e.g. NO or $NO_2$. A modulated solenoid 50 is provided to apply a modulated magnetic field e.g. at 7 Hz, which causes modulation of the absorbing transitions of the gas in the path. The electronic detection circuit 60 is responsive to this magnetic modulation to enhance the sensitivity.

FIGS. 7a and 7b are similar respectively to FIGS. 1a and 1b. In dotted lines in FIG. 7b is shown the splitting of each absorption line resulting from the presence of the magnetic field. The intensity of the magnetic field is established at a high enough value to cause sufficient splitting of the absorption line and offset from the normal absorption frequency so that little absorption occurs of the emission based on the normal absorption transition. Thus it will be seen that an emission line from the lamp will be absorbed less when the magnetic field is applied, more when it is not. By phase sensitive detection synchronized with the frequency of modulation of the magnetic field, the detection sensitivity can be considerably enhanced.

In an alternative embodiment the gas within the lamp chamber 10 of FIG. 6 is paramagnetic and a modulated magnetic field is applied to it as by helmholz coil 62 shown in dotted lines, in this case omitting the solenoid 50 along the detection path. This results in a condition reverse of that of FIGS. 7a and 7b, i.e. the emission lines of the lamp split upon application of the magnetic field (while the integrated intensity of the emission remains substantially the same as when there is no magnetic field). With proper choice of field intensity the emissions are so offset in frequency from the normal absorption line of the gas in path 20a that the emission is not absorbed by the trace gas when the field is on. As in the former case, here too, the radiation intensity carrying the absorption information is modulated at the detector and enables this signal to be distinguished from background reaching the detector by use of a receiver tuned to the modulation frequency. In this case a balanced system as shown in FIG. 5 is preferred to eliminate side effects of the modulation on the lamp.

It is to be noted that the number of possibilities for enhancements and application of the detection techniques of the types described are indeed vast. This is particularly the case since the invention does not necessarily require an inversion of population and hence gain, as in lasers—a requirement which is inhibiting and limits the possibilities.

Among the possible uses of the invention are

Trace gas detectors for mine safety,

Automobile exhaust emission controls,

Fire detection,

Combustion efficiency control,

Oil and mineral vapor exploration,

Detection of gas leaks along pipelines, etc.,

Monitoring trace gases in ducts and smokestacks.

The novel enhanced infrared spectral light source which has been described, in which emissions are selectively obtained and detected at normally absorbing molecular transitions has such simplicity as to make it an excellent candidate for such applications where elaborate laser devices are too expensive for the job and, hence, impractical.

For these applications the spectroscopic lamp according to the invention may be in the form of a simple low cost gas discharge lamp which requires no cryogenic cooling or special geometry nor any devices to provide oscillation as are found in lasers.

What is claimed is:

1. An enhanced emission spectroscopic lamp for trace gas detection of a given molecular gas, said lamp adapted to produce spectral radiation at selected spontaneous emission frequencies in the infrared corresponding to an absorbing molecular rotation-vibration transition band of said given gas, said lamp comprising means defining a gas discharge chamber, excitation means for creating a gaseous discharge within said chamber, a gas mixture within said chamber providing both an excitable buffer gas and a quantity of said given gas, and radiation transmissive means for transmitting emissions from said given gas in said chamber to a point of utilization located outside of said chamber, said buffer gas having a first state excitable by said excitation means and matched to said given gas in the manner that energy from said state of said buffer gas can transfer via collisions to said given gas an excite the upper levels of said absorbing transition band, whereby resultant radiative decay of said upper levels to the lower levels of said absorbing transition band produces the desired selected spontaneous emissions from said given gas enhanced by said buffer gas, said gas mixture having the characteristic, in response to said excitation means, of producing undesired other spontaneous emissions as a result of excitation of other levels whose decay time is short relative to the period of said desired emission of said given gas, said lamp combined with means periodically to interrupt said excitation means, and delay means adapted to delay the transmission of emission from the lamp to said point of utilization for a period of time following de-energization of said excitation means to a second period when said other levels whose decay time is relatively short are decayed and said given gas continues to emit at the desired transition.

2. The enhanced emission spectroscopic lamp of claim 1 wherein said mixture of gases in said chamber includes a plurality of components chemically reactive under the influence of the discharge of said excitation means to produce said given gas.

3. The enhanced emission spectroscopic lamp of claim 2 including means to vary the quantity of at least one of said components in the manner to vary the quantity of said given gas present in said discharge.

4. The enhanced emission spectroscopic lamp of claim 3 wherein said gas mixture comprises $N_2$ and CO, said given gas producible by said excitation means is NO and including means to vary the quantity of $N_2$ to accordingly vary the concentration of NO in said discharge.

5. The enhanced emission spectroscopic lamp of claim 1 wherein said mixture comprises CO as said buffer gas and NO as said given gas.

6. The enhanced emission spectroscopic lamp of claim 5 wherein said buffer gas includes $N_2$, excitation transfer from excited $N_2$ to CO serving to enhance the excited CO level and thereby enhance the desired NO level to produce the desired emission.

7. The enhanced emission spectroscopic lamp of claim 1 wherein said mixture produces $N_2$ as buffer gas and $SO_2$ as said given gas, said state of said buffer gas matched to the $2\nu_1$ vibrational mode in $SO_2$, said $2\nu_1$ decaying by near V-V collisions to the $\nu_1$ vibration mode thence to the $\nu_2$ vibration mode, emission from said $\nu_2$ band providing the desired emissions.

8. The spectroscopic lamp of claim 1 wherein said mixture provides $N_2$ as buffer gas and CO as said given gas.

9. The lamp of claim 1 wherein said delay means comprises a chopper positioned between said lamp and said point of utilization, said chopper having means to shield against transmission of emissions from said lamp to said point of utilization occurring prior to said second period and having means to allow transmission of emissions to said point of utilization during said second period.

10. The lamp of claim 9 including a trigger circuit activated by the position of the chopper and adapted to trigger a pulse of said excitation means while said chopper shield means is in a condition to shield said point of utilization from receiving emissions from said lamp.

11. The enhanced emission spectroscopic lamp of claim 1 wherein the given gas is of a character having no amplification gain at the said transition band and the quantity of said given gas is adapted to prevent detrimental re-absorption of said desired emission.

12. The enhanced emission spectroscopic lamp of claim 1 wherein said buffer gas is a molecule having its first excited vibration state matched to an excited vibration state of said given gas, said state of said buffer gas being of a type which in its pure form decays essentially by V-T collisions, and the excitation of said vibrational state of said given gas by the buffer gas characteristically occurring by near V-V collisions.

13. The enhanced emission spectroscopic lamp of claim 1 wherein the excited vibration state of said given gas is excited essentially by near V-V collisions of its molecules with excited molecules of said buffer gas and said state of said given gas is of the character that decays predominantly by V-T collisions while producing the desired spontaneous emission.

14. The enhanced emission spectroscopic lamp of claim 1 wherein an upper excited vibration state of said given gas is excited essentially by near V-V collisions of its molecules with excited molecules of said buffer gas, said upper excited vibration state of said given gas having the characteristics of decaying to a lower excited vibration state corresponding to the upper vibration state of said absorbing transition band and said lower excited vibration state having the characteristic of decaying predominantly by V-T collisions while producing the desired spontaneous emission.

15. The enhanced emission spectroscopic lamp of claim 1 wherein the excited vibration state of said given gas which produces the desired emission is of a character that predominantly decays by V-T collisions, said other levels of said gas mixture which produce said undesired spontaneous emissions while decaying at a faster rate being of character that decay essentially by near V-V collisions and said delay means adapted to initiate the time of said utilization after substantial decays of said levels producing said undesired emissions.

* * * * *

UNITED STATES PATENT AND TRADEMARK OFFICE
CERTIFICATE OF CORRECTION

PATENT NO. : 4,274,063
DATED : June 16, 1981
INVENTOR(S) : Ali Javan, 12 Hawthorn Street, Cambridge, MA It is certified that error appears in the above-identified patent and that said Letters Patent are hereby corrected as shown below:

Column 1, line 7, "Tnere ae" should be --There are --.

Column 5, line 37 "of the V = 1 in No" should be -- of the V = 1 state in NO--.

Column 5, line 44, "filter" should be --filter 36.--.

Column 6, line 39, "No states" should be --NO states--.

Column 8, line 20, "an excite" should be --and excite--.

*Signed and Sealed this*

*Twenty-fourth* Day of *November 1981*

[SEAL]

Attest:

Attesting Officer

GERALD J. MOSSINGHOFF

Commissioner of Patents and Trademarks